United States Patent
Shih (10) Patent No.: US 10,241,294 B2
(45) Date of Patent: Mar. 26, 2019

(54) INFRARED RAY-TRACING LENS MODULE

(71) Applicants: AO Ether Optronics (Shenzhen) Limited, Shenzhen, Guangdong Province (CN); AO Ether Corporation, Taichung (TW)

(72) Inventor: Po-Yuan Shih, Taichung (TW)

(73) Assignees: AO ETHER OPTRONICS (SHENZHEN) LIMITED, Shenzhen, Guangdong Province (CN); AOE Optronics Co., Inc., Taichung (TW)

( * ) Notice: Subject to any disclaimer, the term of this patent is extended or adjusted under 35 U.S.C. 154(b) by 41 days.

(21) Appl. No.: 14/998,997

(22) Filed: Mar. 15, 2016

(65) Prior Publication Data
US 2016/0299316 A1 Oct. 13, 2016

(30) Foreign Application Priority Data
Apr. 8, 2015 (CN) .......................... 2015 1 0164018

(51) Int. Cl.
*G02B 13/14* (2006.01)
*G02B 9/12* (2006.01)
(Continued)

(52) U.S. Cl.
CPC ................ *G02B 9/12* (2013.01); *G02B 5/22* (2013.01); *G02B 7/028* (2013.01); *G02B 13/14* (2013.01)

(58) Field of Classification Search
CPC .......... G02B 9/12; G02B 7/028; G02B 13/14; G02B 5/22; G02B 13/16; G02B 15/177;
(Continued)

(56) References Cited

U.S. PATENT DOCUMENTS

2013/0301145 A1\* 11/2013 Tsai ................... G02B 13/0035
359/716
2014/0185134 A1\* 7/2014 Kamitakahara .... G02B 13/0035
359/356
(Continued)

FOREIGN PATENT DOCUMENTS

CN 1677134 A 10/2005
JP 2011-253006 12/2011

OTHER PUBLICATIONS

Chinese language office action dated Jul. 26, 2016, issued in application No. TW 104111196.
(Continued)

*Primary Examiner* — Jade R Chwasz
*Assistant Examiner* — Rahman Abdur
(74) *Attorney, Agent, or Firm* — McClure, Qualey & Rodack, LLP (57) ABSTRACT

An infrared ray-tracing lens module is provided. The infrared ray-tracing lens module is adapted to receive light from an object. The infrared ray-tracing lens module includes a first positive diopter lens, a second positive diopter lens, a negative diopter lens and an image unit. The first positive diopter lens, the second positive diopter lens and the negative diopter lens are arranged along an optical axis, and the light travels from the object, sequentially passes through the first positive diopter lens, the second positive diopter lens and the negative diopter lens to be projected to the image unit.

19 Claims, 8 Drawing Sheets

(51) Int. Cl.
*G02B 5/22* (2006.01)
*G02B 7/02* (2006.01)

(58) Field of Classification Search
CPC ...... G02B 25/001; G02B 21/02; G02B 13/18; G02B 9/34
USPC ....... 359/350, 355, 356, 357, 689, 715, 714, 359/713, 644, 645, 660, 661
See application file for complete search history.

(56) References Cited

U.S. PATENT DOCUMENTS

2015/0022668 A1* 1/2015 Pekarski ............ G02B 27/0905
348/164
2015/0077622 A1* 3/2015 Ueno ................. G02B 13/0055
348/360

OTHER PUBLICATIONS

Chinese language office action dated Feb. 26, 2018, issued in application No. CN 201510164018.X.

\* cited by examiner

INFRARED RAY-TRACING LENS MODULE

CROSS REFERENCE TO RELATED APPLICATIONS

This application claims priority of Chinese Patent Application No. 201510164018.X, filed on Apr. 8, 2015, the entirety of which is incorporated by reference herein.

BACKGROUND OF THE INVENTION

Field of the Invention

The present invention relates to a lens module, and in particular to an infrared ray-tracing lens module.

Description of the Related Art

Infrared ray-tracing lens modules and eyeball-tracing lens modules are commonly utilized in night monitoring, recording night driving, and nighttime telescoping technology. The optical lens module is the most important component. Conventionally, glass lenses and plastic lenses are utilized to improve image quality. However, in a conventional infrared ray-tracing lens module, the lenses deform due to temperature variations, and image quality is therefore decreased.

BRIEF SUMMARY OF THE INVENTION

An infrared ray-tracing lens module is provided. The infrared ray-tracing lens module is adapted to receive light from an object. The infrared ray-tracing lens module includes a first positive diopter lens, a second positive diopter lens, a negative diopter lens and an image unit. The first positive diopter lens includes a first lens surface and a second lens surface, wherein the first lens surface is opposite to the second lens surface, the first lens surface is a convex surface, and the second lens surface is a concave surface. The second positive diopter lens includes a third lens surface and a fourth lens surface, wherein the third lens surface is opposite to the fourth lens surface, and the third lens surface is a convex surface. The negative diopter lens includes a fifth lens surface and a sixth lens surface, wherein the fifth lens surface is opposite to the sixth lens surface, and the fifth lens surface is a concave surface. The first positive diopter lens, the second positive diopter lens and the negative diopter lens are arranged along an optical axis, and the light travels from the object, sequentially passes through the first positive diopter lens, the second positive diopter lens and the negative diopter lens to be projected to the image unit. The first, third and fifth lens surfaces face the object. The second, fourth and sixth lens surfaces face the image unit.

In one embodiment, the infrared ray-tracing lens module includes an aperture, wherein the aperture is disposed between the second positive diopter lens and the negative diopter lens.

In one embodiment, the infrared ray-tracing lens module includes a color filter, wherein the color filter is disposed between the negative diopter lens and the image unit.

Utilizing the design and arrangement of the lenses (10, 20 and 30), the viewing angle range of the infrared ray-tracing lens module can be decreased, and an auto temperature compensation function is provided by the infrared ray-tracing lens module. When the dimensions of the lenses (10, 20 and 30) vary due to being heated or cooled, the convex and concave lens surface arrangement and the positive-positive-negative diopter lens arrangement automatically compensate for the size variation, and the resolution of the infrared ray-tracing lens module is improved.

A detailed description is given in the following embodiments with reference to the accompanying drawings.

BRIEF DESCRIPTION OF THE DRAWINGS

The present invention can be more fully understood by reading the subsequent detailed description and examples with references made to the accompanying drawings, wherein.

DETAILED DESCRIPTION OF THE INVENTION

The following description is of the best-contemplated mode of carrying out the invention. This description is made for the purpose of illustrating the general principles of the invention and should not be taken in a limiting sense. The scope of the invention is best determined by reference to the appended claims.

Figure 1A:
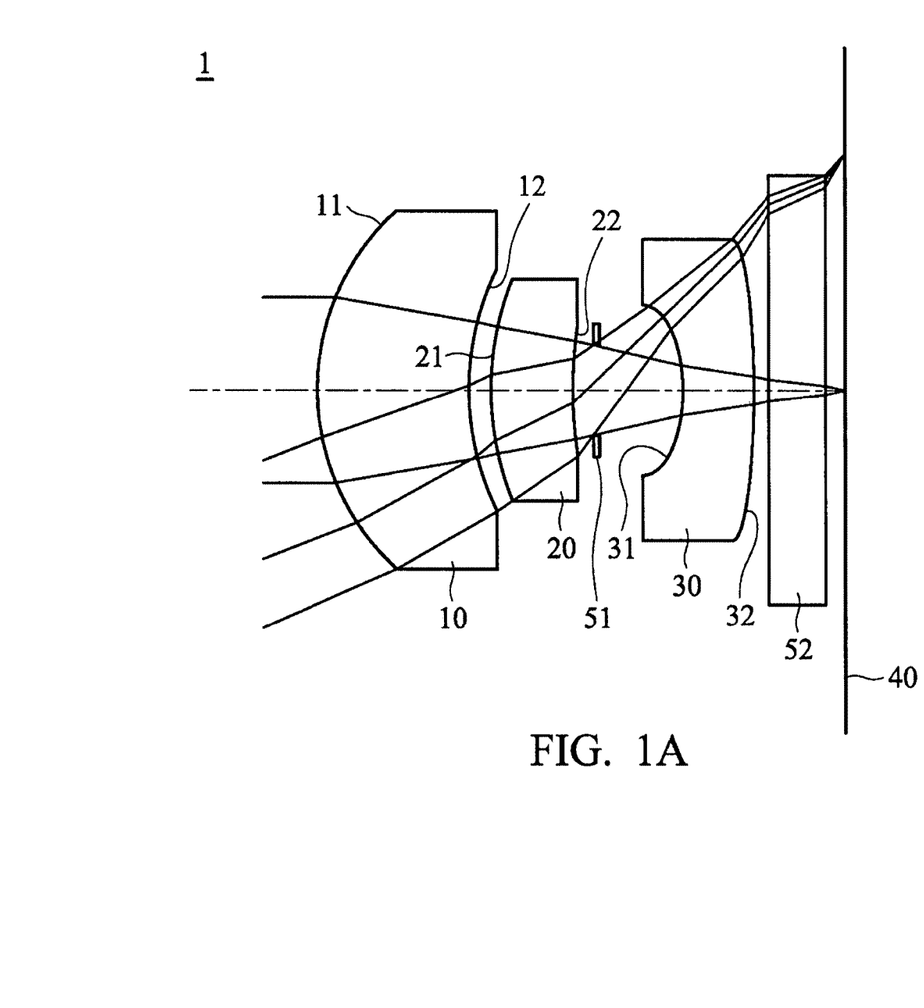
FIG. 1A shows the infrared ray-tracing lens module of the first embodiment of the invention.

FIG. 1A shows an infrared ray-tracing lens module 1 of an embodiment of the invention. The infrared ray-tracing lens module 1 is adapted to receive light from an object (not shown). The infrared ray-tracing lens module 1 includes a first positive diopter lens 10, a second positive diopter lens 20, a negative diopter lens 30 and an image unit 40. The first positive diopter lens 10 includes a first lens surface 11 and a second lens surface 12. The first lens surface 11 is opposite to the second lens surface 12. The first lens surface 11 is a convex surface, and the second lens surface 12 is a concave surface. The second positive diopter lens 20 includes a third lens surface 21 and a fourth lens surface 22. The third lens surface 21 is opposite to the fourth lens surface 22, and the third lens surface 21 is a convex surface. The negative diopter lens 30 includes a fifth lens surface 31 and a sixth lens surface 32. The fifth lens surface 31 is opposite to the sixth lens surface 32, and the fifth lens surface 31 is a concave surface.

In one embodiment, the first positive diopter lens 10, the second positive diopter lens 20 and the negative diopter lens 30 are arranged along an optical axis, and the light travels from the object, sequentially passes through the first positive diopter lens 10, the second positive diopter lens 20 and the negative diopter lens 30 to be projected to the image unit 40. The first, third and fifth lens surfaces (11, 21, 31) face the object. The second, fourth and sixth lens surfaces (12, 22, 32) face the image unit 40.

Utilizing the design and arrangement of the lenses (10, 20 and 30), the viewing angle range of the infrared ray-tracing lens module can be decreased, and an auto temperature compensation function is provided by the infrared ray-tracing lens module. When the dimension of the lenses (10, 20 and 30) varies due to being heated or cooled, the convex and concave lens surfaces arrangement and the positive-positive-negative diopter lenses arrangement compensate for the dimension variation automatically, and the resolution of the infrared ray-tracing lens module is improved. In one embodiment, the viewing angle range of the infrared ray-tracing lens is between 28.5 degrees and 31.5 degrees.

With reference to FIG. 1A, in one embodiment, the infrared ray-tracing lens module includes an aperture 51 and a color filter 52. The aperture 51 is disposed between the second positive diopter lens 20 and the negative diopter lens 30. The color filter 52 is disposed between the negative diopter lens 30 and the image unit 40.

With reference to FIG. 1A, in one embodiment, the fourth lens surface 22 is a concave surface, and the sixth lens surface 32 is a convex surface. In one embodiment, the infrared ray-tracing lens module has an effective focal length f, the first positive diopter lens 10 has a first focal length $f_1$, the second positive diopter lens 20 has a second focal length $f_2$, the negative diopter lens 30 has a third focal length $f_3$, and a first distance TTL is formed between the image unit 40 and the first lens surface 11 along the optical axis. The first lens surface 11 has a first radius of curvature $R_{11}$, the second lens surface 12 has a second radius of curvature $R_{12}$, the third lens surface 21 has a third radius of curvature $R_{21}$, the fourth lens surface 22 has a fourth radius of curvature $R_{22}$, the fifth lens surface 31 has a fifth radius of curvature $R_{31}$, and the sixth lens surface 32 has a sixth radius of curvature $R_{32}$. The infrared ray-tracing lens module 1 satisfies the following equations:

$$\frac{f_2}{f} = 1.7554$$

$$\frac{f}{TTL} = 1.0348$$

$$\left(\frac{R_{11} - R_{12}}{R_{11} + R_{12}}\right) \cdot \left(\frac{R_{21} - R_{22}}{R_{21} + R_{22}}\right) \cdot \left(\frac{R_{31} - R_{32}}{R_{31} + R_{32}}\right) = -0.0590$$

The data disclosed above is an example, which is not meant to restrict the invention. The infrared ray-tracing lens module satisfying the above equations provides the auto temperature compensation function and improved resolution.

In one embodiment, the detailed parameters of the elements of the infrared ray-tracing lens module are presented in Table 1. The data disclosed in Table 1 is an example, which is not meant to restrict the invention.

TABLE 1

| Focal Length = 2.29 mm, Fno. = 2.4, FOV = 44° | | | | | |
|---|---|---|---|---|---|
| Surface No. | The radius of curvature (mm) | Thickness (mm) | Index of refraction (Nd) | Abbe number (Vd) | Material Remark |
| 0 | Infinity | 325 | | | object |
| 1 | 1.125 | 0.827 | 1.606 | 57.5 | glass First lens |
| 2 | 2.170 | 0.058 | | | |
| 3 | 1.539 | 0.442 | 1.535 | 55.7 | plastic Second lens |
| 4 | 3.620 | 0.083 | | | |
| 5 | Infinity | 0.519 | | | Aperture |
| 6 | −1.639 | 0.200 | 1.535 | 55.7 | plastic Third lens |
| 7 | −4.449 | 0.100 | | | |
| 8 | Infinity | 0.210 | 1.517 | 64.2 | glass Color filter |
| 9 | Infinity | 0.123 | | | Image surface |

Figure 1B:
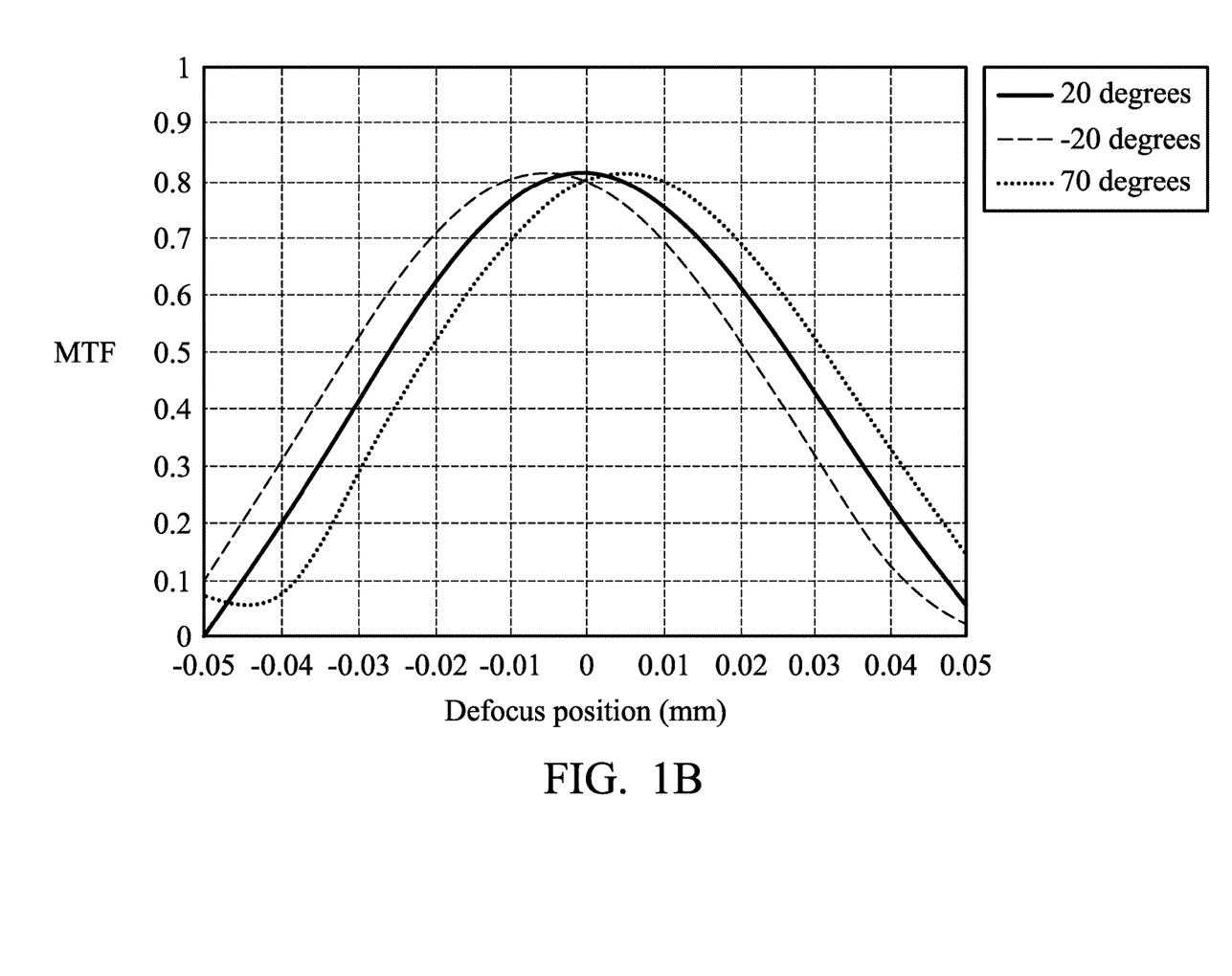
FIG. 1B shows the experimental data of the first embodiment of the invention.

FIG. 1B shows the experimental data of the first embodiment of the invention, wherein the horizontal axis presents a defocus position, and the vertical axis presents MTF (Modulation Transfer Function). As shown in FIG. 1B, the infrared ray-tracing lens module 1 of the first embodiment provides improved image quality within the parameters of Table 1.

Figure 2A:
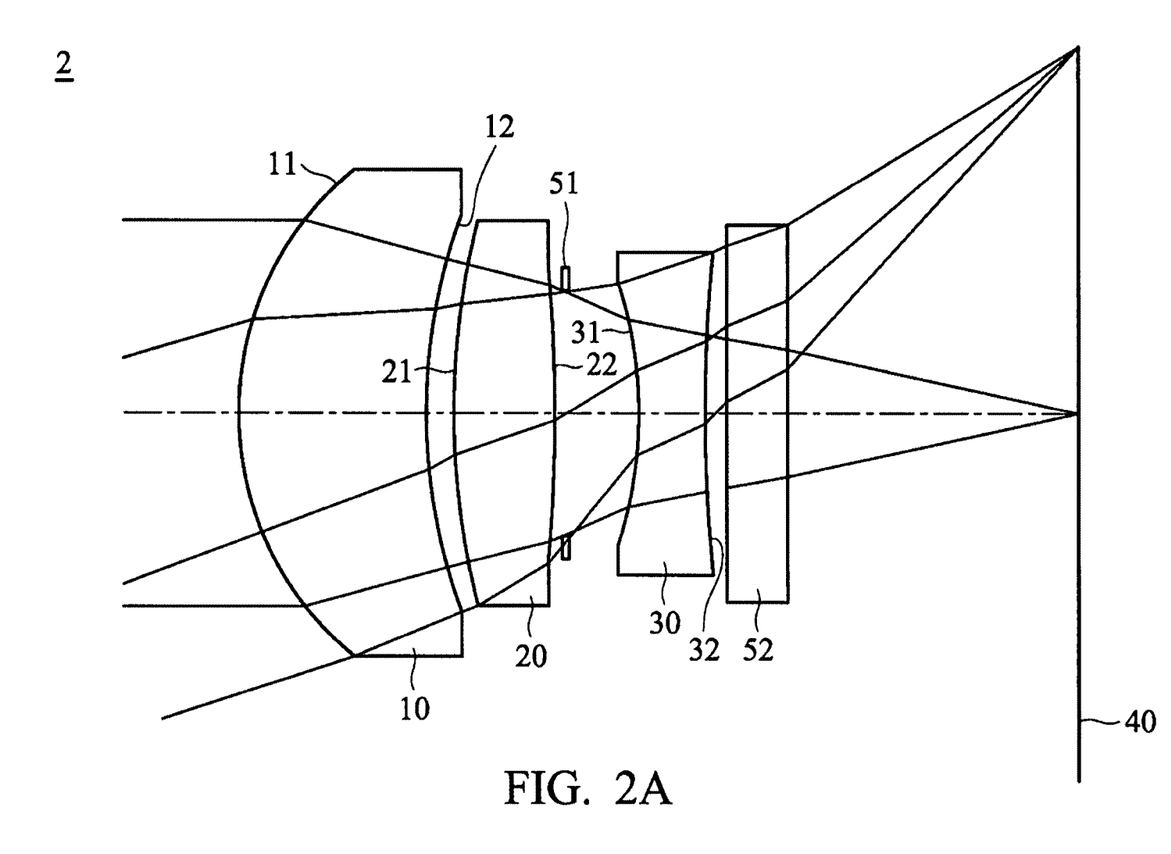
FIG. 2A shows the infrared ray-tracing lens module of the second embodiment of the invention.

FIG. 2A shows an infrared ray-tracing lens module 2 of a second embodiment of the invention. Compared to the first embodiment, the fourth lens surface 22 is a convex surface, and the sixth lens surface 32 is a concave surface. In one embodiment, the infrared ray-tracing lens module 2 of the second embodiment satisfies the following equations:

$$\frac{f_2}{f} = 1.4367$$

$$\frac{f}{TTL} = 1.0435$$

$$\left(\frac{R_{11} - R_{12}}{R_{11} + R_{12}}\right) \cdot \left(\frac{R_{21} - R_{22}}{R_{21} + R_{22}}\right) \cdot \left(\frac{R_{31} - R_{32}}{R_{31} + R_{32}}\right) = -0.2693$$

The data disclosed above is an example, which is not meant to restrict the invention. The infrared ray-tracing lens module satisfying the above equations provides the auto temperature compensation function and improved resolution.

In the second embodiment, the detailed parameters of the elements of the infrared ray-tracing lens module are presented in Table 2. The data disclosed in Table 2 is an example, which is not meant to restrict the invention.

TABLE 2

Focal Length = 3.705 mm, Fno. = 2.4, FOV = 33°

| Surface No. | The radius of curvature (mm) | Thickness (mm) | Index of refraction (Nd) | Abbe number (Vd) | Material | Remark |
|---|---|---|---|---|---|---|
| 0 | Infinity | 325 | | | | object |
| 1 | 1.144 | 0.800 | 1.606 | 57.5 | glass | First lens |
| 2 | 1.866 | 0.140 | | | | |
| 3 | 2.894 | 0.390 | 1.535 | 55.7 | plastic | Second lens |
| 4 | −92.961 | 0.050 | | | | |
| 5 | Infinity | 0.458 | | | | Aperture |
| 6 | −1.990 | 0.250 | 1.535 | 55.7 | plastic | Third lens |
| 7 | 75.131 | 0.100 | | | | |
| 8 | Infinity | 0.210 | 1.517 | 64.2 | glass | Color filter |
| 9 | Infinity | 1.152 | | | | Image surface |

Figure 2B:
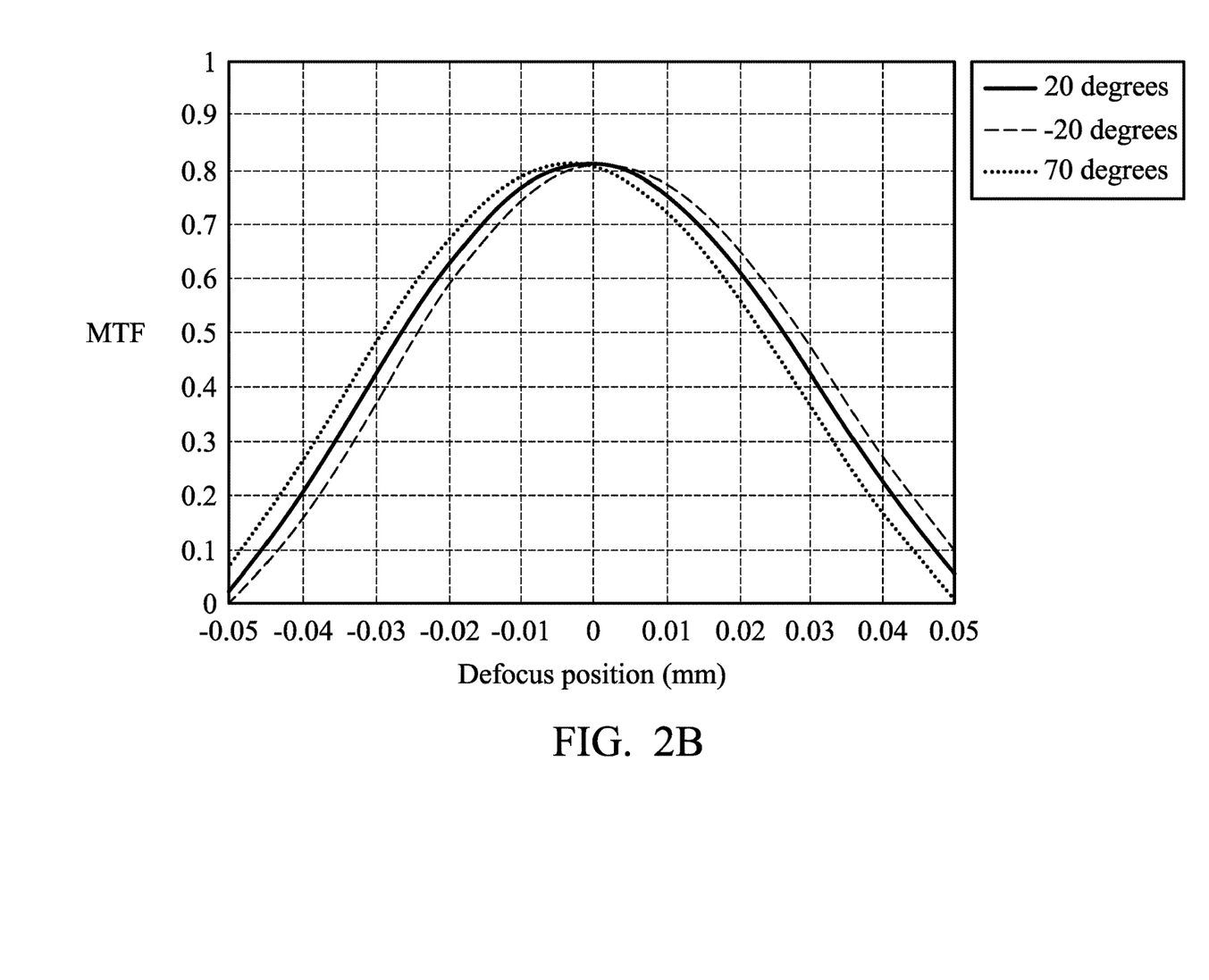
FIG. 2B shows the experimental data of the second embodiment of the invention.

FIG. 2B shows the experimental data of the second embodiment of the invention, wherein the horizontal axis presents a defocus position, and the vertical axis presents MTF. As shown in FIG. 2B, the infrared ray-tracing lens module 2 of the second embodiment provided an improved image quality within the parameters of Table 2.

Figure 3A:
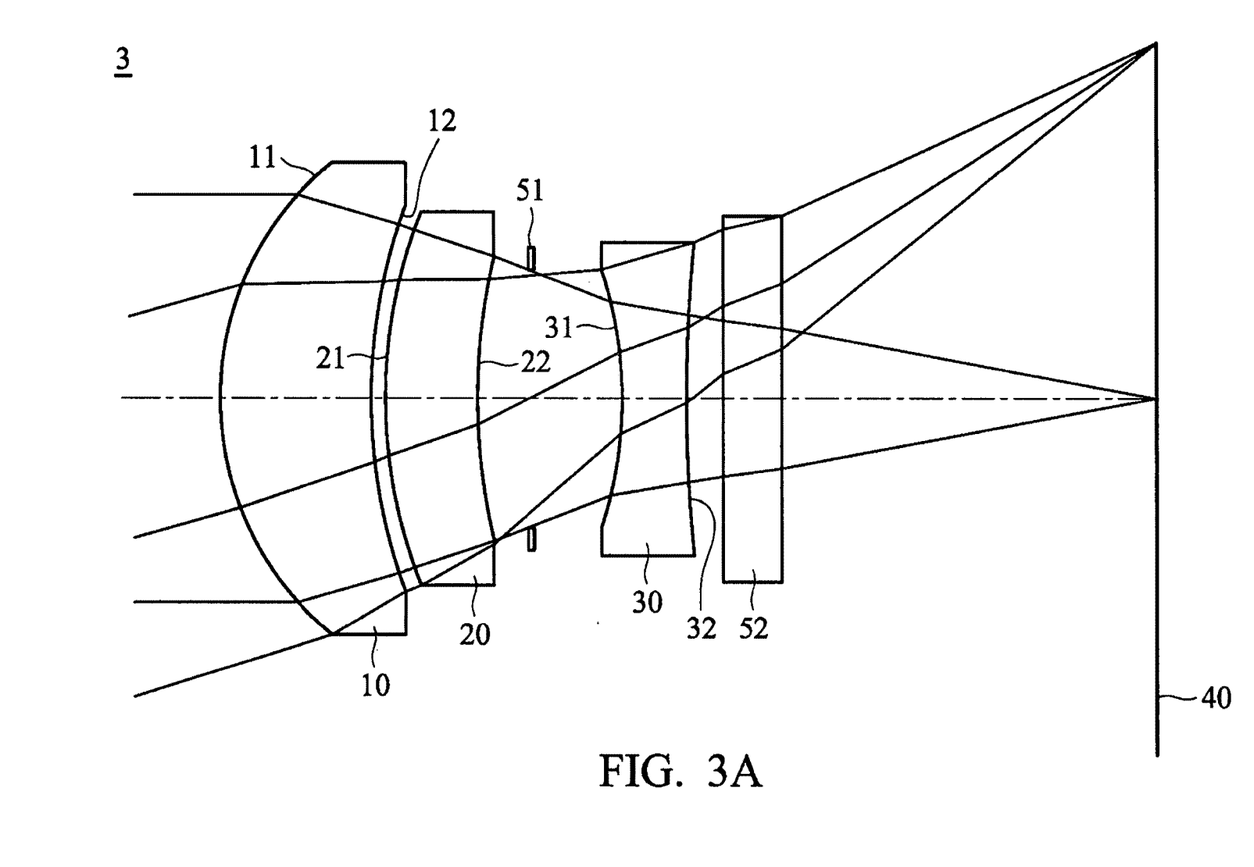
FIG. 3A shows the infrared ray-tracing lens module of the third embodiment of the invention.

FIG. 3A shows an infrared ray-tracing lens module 3 of a third embodiment of the invention. Compared to the first embodiment, the fourth lens surface 22 is a concave surface, and the sixth lens surface 32 is a concave surface. In one embodiment, the infrared ray-tracing lens module 3 of the third embodiment satisfies the following equations:

$$\frac{f_2}{f} = 3.1104$$

$$\frac{f}{TTL} = 1.1509$$

$$\left(\frac{R_{11} - R_{12}}{R_{11} + R_{12}}\right) \cdot \left(\frac{R_{21} - R_{22}}{R_{21} + R_{22}}\right) \cdot \left(\frac{R_{31} - R_{32}}{R_{31} + R_{32}}\right) = -0.4461$$

The data disclosed above is an example, which is not meant to restrict the invention. The infrared ray-tracing lens module satisfying the above equations provides the auto temperature compensation function and improved resolution.

In the third embodiment, the detailed parameters of the elements of the infrared ray-tracing lens module are presented in Table 3. The data disclosed in Table 3 is an example, which is not meant to restrict the invention.

Figure 3B:
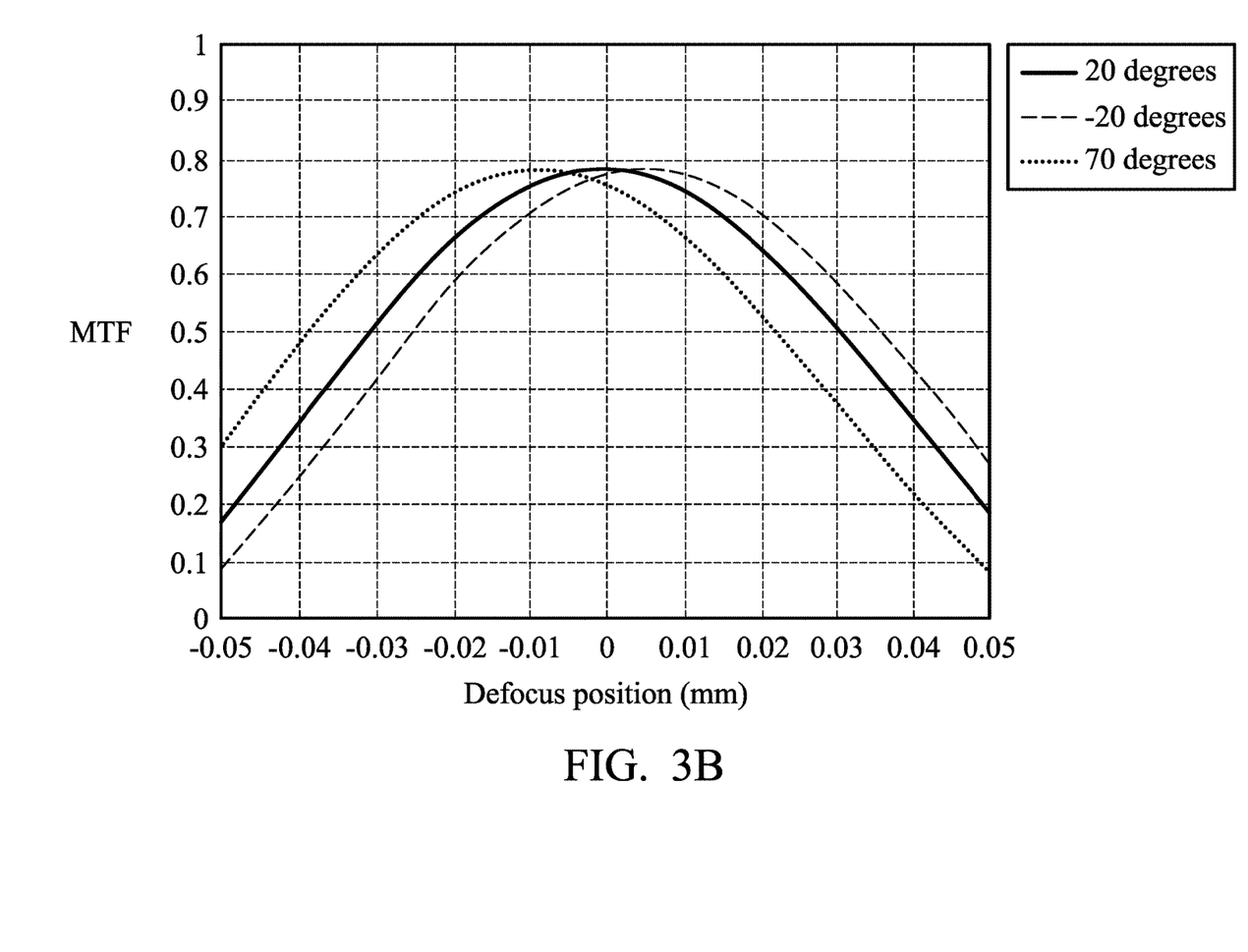
FIG. 3B shows the experimental data of the third embodiment of the invention.

FIG. 3B shows the experimental data of the third embodiment of the invention, wherein the horizontal axis presents a defocus position, and the vertical axis presents MTF. As shown in FIG. 3B, the infrared ray-tracing lens module 3 of the third embodiment provided an improved image quality within the parameters of Table 3.

Figure 4A:
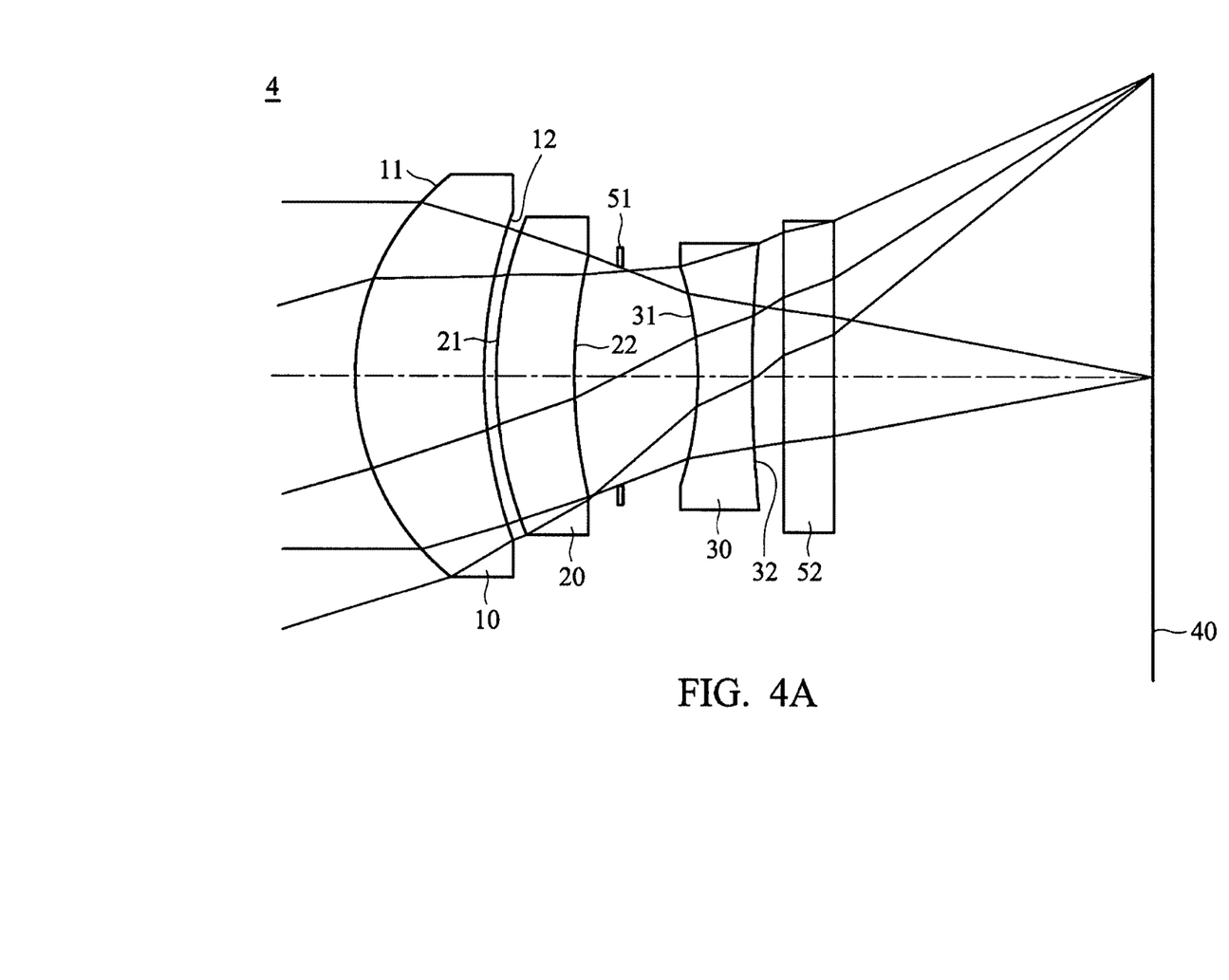
FIG. 4A shows the infrared ray-tracing lens module of the fourth embodiment of the invention.

FIG. 4A shows an infrared ray-tracing lens module 4 of a fourth embodiment of the invention. Compared to the first embodiment, the sixth lens surface 32 is a convex surface. In one embodiment, the infrared ray-tracing lens module 4 of the fourth embodiment satisfies the following equations:

$$\frac{f_2}{f} = 2.4861$$

$$\frac{f}{TTL} = 1.0246$$

$$\left(\frac{R_{11} - R_{12}}{R_{11} + R_{12}}\right) \cdot \left(\frac{R_{21} - R_{22}}{R_{21} + R_{22}}\right) \cdot \left(\frac{R_{31} - R_{32}}{R_{31} + R_{32}}\right) = -0.9332$$

The data disclosed above is an example, which is not meant to restrict the invention. The infrared ray-tracing lens module satisfying the above equations provides the auto temperature compensation function and improved resolution.

In the fourth embodiment, the detailed parameters of the elements of the infrared ray-tracing lens module is presented in Table 4. The data disclosed in Table 4 is an example, which is not meant to restrict the invention.

TABLE 3

Focal Length = 4.09 mm, Fno. = 2.8, FOV = 30°

| Surface No. | The radius of curvature (mm) | Thickness (mm) | Index of refraction (Nd) | Abbe number (Vd) | Material | Remark |
|---|---|---|---|---|---|---|
| 0 | Infinity | 325 | | | | object |
| 1 | 1.080 | 0.560 | 1.606 | 57.5 | glass | First lens |
| 2 | 1.899 | 0.050 | | | | |
| 3 | 1.786 | 0.356 | 1.535 | 55.7 | plastic | Second lens |
| 4 | 2.267 | 0.193 | | | | |
| 5 | Infinity | 0.356 | | | | Aperture |
| 6 | −3.644 | 0.250 | 1.535 | 55.7 | plastic | Third lens |
| 7 | 3.148 | 0.137 | | | | |
| 8 | Infinity | 0.210 | 1.517 | 64.2 | glass | Color filter |
| 9 | Infinity | 1.437 | | | | Image surface |

TABLE 4

Focal Length = 3.637 mm, Fno. = 2.8, FOV = 29°

| Surface No. | The radius of curvature (mm) | Thickness (mm) | Index of refraction (Nd) | Abbe number (Vd) | Material | Remark |
|---|---|---|---|---|---|---|
| 0 | Infinity | 325 | | | | object |
| 1 | 1.090 | 0.558 | 1.606 | 57.5 | glass | First lens |
| 2 | 3.081 | 0.030 | | | | |
| 3 | 2.079 | 0.338 | 1.535 | 55.7 | plastic | Second lens |
| 4 | 3.475 | 0.203 | | | | |
| 5 | Infinity | 0.447 | | | | Aperture |
| 6 | −2.923 | 0.250 | 1.535 | 55.7 | plastic | Third lens |
| 7 | 3.786 | 0.137 | | | | |
| 8 | Infinity | 0.210 | 1.517 | 64.2 | glass | Color filter |
| 9 | Infinity | 1.377 | | | | Image surface |

Figure 4B:
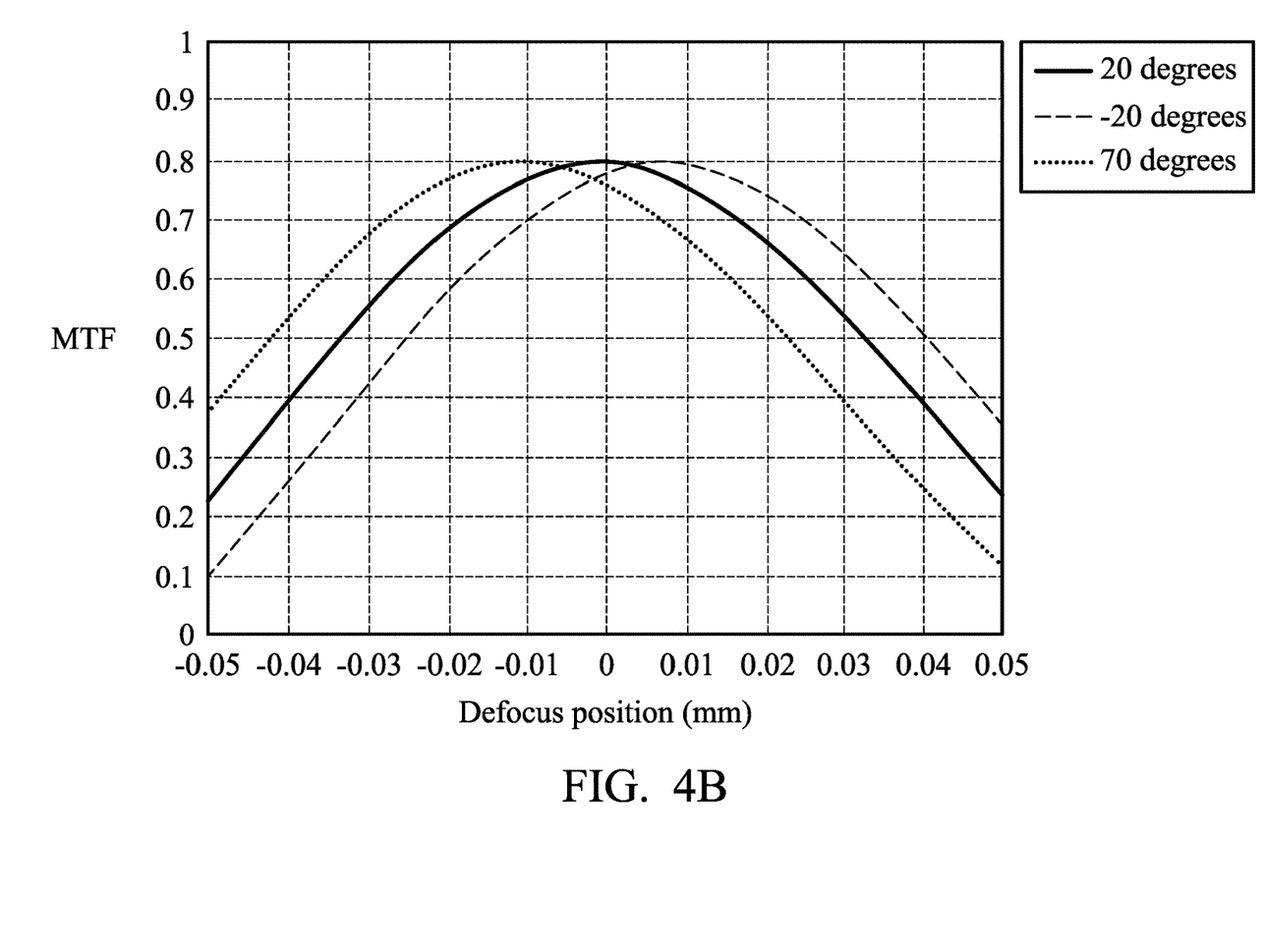
FIG. 4B shows the experimental data of the fourth embodiment of the invention.

FIG. 4B shows the experimental data of the fourth embodiment of the invention, wherein the horizontal axis presents a defocus position, and the vertical axis presents MTF. As shown in FIG. 4B, the infrared ray-tracing lens module 4 of the fourth embodiment provided an improved image quality within the parameters of Table 4.

In one embodiment, the infrared ray-tracing lens module further includes a plurality of infrared rays light sources, wherein the light is emitted from the infrared rays light sources, reflected by the object, passes through the first positive diopter lens 10, the second positive diopter lens 20 and the negative diopter lens 30 to be projected to the image unit 40.

Specifically, the infrared ray-tracing lens module of the embodiment of the invention satisfies the following equations:

$$1 \le \frac{f_2}{f} \le 5$$

$$1 \le \frac{f}{TTL} \le 2$$

$$-1 \le \left(\frac{R_{11} - R_{12}}{R_{11} + R_{12}}\right) \cdot \left(\frac{R_{21} - R_{22}}{R_{21} + R_{22}}\right) \cdot \left(\frac{R_{31} - R_{32}}{R_{31} + R_{32}}\right) \le 1$$

The infrared ray-tracing lens module satisfying the above equations provides the auto temperature compensation function and improved resolution.

Use of ordinal terms such as "first", "second", "third", etc., in the claims to modify a claim element does not by itself connote any priority, precedence, or order of one claim element over another or the temporal order in which acts of a method are performed, but are used merely as labels to distinguish one claim element having a certain name from another element having the same name (but for use of the ordinal term).

While the invention has been described by way of example and in terms of the preferred embodiments, it is to be understood that the invention is not limited to the disclosed embodiments. On the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. An infrared ray-tracing lens module, adapted to receive light from an object, comprising:
   a first positive diopter lens, comprising a first lens surface and a second lens surface, wherein the first lens surface is opposite to the second lens surface, the first lens surface is a convex surface, and the second lens surface is a concave surface;
   a second positive diopter lens, comprising a third lens surface and a fourth lens surface, wherein the third lens surface is opposite to the fourth lens surface, and the third lens surface is a convex surface;
   a negative diopter lens, comprising a fifth lens surface and a sixth lens surface, wherein the fifth lens surface is opposite to the sixth lens surface, and the fifth lens surface is a concave surface;
   an image unit, wherein the first positive diopter lens, the second positive diopter lens and the negative diopter lens are arranged along an optical axis, and the light travels from the object, sequentially passes through the first positive diopter lens, the second positive diopter lens and the negative diopter lens to be projected to the image unit; and
   an aperture, wherein the aperture is disposed between the second positive diopter lens and the negative diopter lens,
   wherein a viewing angle range of the infrared ray-tracing lens is between 28.5 degrees and 31.5 degrees.

2. The infrared ray-tracing lens module as claimed in claim 1, further comprising a color filter, wherein the color filter is disposed between the negative diopter lens and the image unit.

3. The infrared ray-tracing lens module 1, wherein the fourth lens surface is a concave surface, and the sixth lens surface is a convex surface.

4. The infrared ray-tracing lens module 1, wherein the fourth lens surface is a convex surface, and the sixth lens surface is a concave surface.

5. The infrared ray-tracing lens module 1, wherein the fourth lens surface is a concave surface, and the sixth lens surface is a concave surface.

6. The infrared ray-tracing lens module 1, wherein the infrared ray-tracing lens module has an effective focal length f, the first positive diopter lens has a first focal length $f_1$, the second positive diopter lens has a second focal length $f_2$, the negative diopter lens has a third focal length $f_3$, a first distance TTL is formed between the image unit and the first lens surface along the optical axis, and the infrared ray-tracing lens module satisfies the following equations:

$$1 \le \frac{f_2}{f} \le 5$$

$$1 \le \frac{f}{TTL} \le 2.$$

7. The infrared ray-tracing lens module 6, wherein the first lens surface has a first radius of curvature $R_{11}$, the second lens surface has a second radius of curvature $R_{12}$, the third lens surface has a third radius of curvature $R_{21}$, the fourth lens surface has a fourth radius of curvature $R_{22}$, the fifth lens surface has a fifth radius of curvature $R_{31}$, the sixth lens surface has a sixth radius of curvature $R_{32}$, and the infrared ray-tracing lens module satisfies the following equation:

$$-1 \le \left(\frac{R_{11}-R_{12}}{R_{11}+R_{12}}\right) \cdot \left(\frac{R_{21}-R_{22}}{R_{21}+R_{22}}\right) \cdot \left(\frac{R_{31}-R_{32}}{R_{31}+R_{32}}\right) \le 1.$$

8. An infrared ray-tracing lens module, adapted to receive light from an object, comprising:
 a first positive diopter lens, comprising a first lens surface and a second lens surface, wherein the first lens surface is opposite to the second lens surface, the first lens surface is a convex surface, and the second lens surface is a concave surface;
 a second positive diopter lens, comprising a third lens surface and a fourth lens surface, wherein the third lens surface is opposite to the fourth lens surface, and the third lens surface is a convex surface;
 a negative diopter lens, comprising a fifth lens surface and a sixth lens surface, wherein the fifth lens surface is opposite to the sixth lens surface, and the fifth lens surface is a concave surface;
 an image unit, wherein the first positive diopter lens, the second positive diopter lens and the negative diopter lens are arranged along an optical axis, and the light travels from the object, sequentially passes through the first positive diopter lens, the second positive diopter lens and the negative diopter lens to be projected to the image unit,
 wherein the infrared ray-tracing lens module has an effective focal length f, the first positive diopter lens has a first focal length $f_1$, the second positive diopter lens has a second focal length $f_2$, the negative diopter lens has a third focal length f3, a first distance TTL is formed between the image unit and the first lens surface along the optical axis, and the infrared ray-tracing lens module satisfies the following equation:

$$1 \le \frac{f}{TTL} \le 2.$$

9. The infrared ray-tracing lens module as claimed in claim 8, further comprising an aperture, wherein the aperture is disposed between the second positive diopter lens and the negative diopter lens.

10. The infrared ray-tracing lens module 8, wherein the infrared ray-tracing lens module satisfies the following equation:

$$1 \le \frac{f_2}{f} \le 5.$$

11. The infrared ray-tracing lens module 10, wherein the first lens surface has a first radius of curvature $R_{11}$, the second lens surface has a second radius of curvature $R_{12}$, the third lens surface has a third radius of curvature $R_{21}$, the fourth lens surface has a fourth radius of curvature $R_{22}$, the fifth lens surface has a fifth radius of curvature $R_{31}$, the sixth lens surface has a sixth radius of curvature $R_{32}$, and the infrared ray-tracing lens module satisfies the following equation:

$$-1 \le \left(\frac{R_{11}-R_{12}}{R_{11}+R_{12}}\right) \cdot \left(\frac{R_{21}-R_{22}}{R_{21}+R_{22}}\right) \cdot \left(\frac{R_{31}-R_{32}}{R_{31}+R_{32}}\right) \le 1.$$

12. The infrared ray-tracing lens module 8, wherein the first distance TTL satisfies the following equation:

2.56≤TTL≤3.55.

13. The infrared ray-tracing lens module 8, wherein a viewing angle range of the infrared ray-tracing lens is between 28.5 degrees and 31.5 degrees.

14. An infrared ray-tracing lens module, adapted to receive light from an object, comprising:
 a first positive diopter lens, comprising a first lens surface and a second lens surface, wherein the first lens surface is opposite to the second lens surface;
 a second positive diopter lens, comprising a third lens surface and a fourth lens surface, wherein the third lens surface is opposite to the fourth lens surface;
 a negative diopter lens, comprising a fifth lens surface and a sixth lens surface, wherein the fifth lens surface is opposite to the sixth lens surface;
 an image unit, wherein the first positive diopter lens, the second positive diopter lens and the negative diopter lens are arranged along an optical axis, and the light travels from the object, sequentially passes through the first positive diopter lens, the second positive diopter lens and the negative diopter lens to be projected to the image unit,
 wherein the first lens surface is a convex paraxial surface, the second lens surface is a concave paraxial surface, the third lens surface is a convex paraxial surface, the fourth lens surface is a concave paraxial surface, the fifth lens surface is a concave paraxial surface, and the sixth lens surface is a convex paraxial surface.

15. The infrared ray-tracing lens module as claimed in claim 14, further comprising an aperture, wherein the aperture is disposed between the second positive diopter lens and the negative diopter lens.

16. The infrared ray-tracing lens module 14, wherein the infrared ray-tracing lens module has an effective focal length f, the first positive diopter lens has a first focal length $f_1$, the second positive diopter lens has a second focal length $f_2$, the negative diopter lens has a third focal length f3, a first distance TTL is formed between the image unit and the first lens surface along the optical axis, and the infrared ray-tracing lens module satisfies the following equation:

$$1 \le \frac{f}{TTL} \le 2.$$

17. The infrared ray-tracing lens module 16, wherein the infrared ray-tracing lens module satisfies the following equation:

$$1 \le \frac{f_2}{f} \le 5.$$

18. The infrared ray-tracing lens module 17, wherein the first lens surface has a first radius of curvature $R_{11}$, the second lens surface has a second radius of curvature $R_{12}$, the third lens surface has a third radius of curvature $R_{21}$, the fourth lens surface has a fourth radius of curvature $R_{22}$, the fifth lens surface has a fifth radius of curvature $R_{31}$, the sixth lens surface has a sixth radius of curvature $R_{32}$, and the infrared ray-tracing lens module satisfies the following equation:

$$-1 \le \left(\frac{R_{11} - R_{12}}{R_{11} + R_{12}}\right) \cdot \left(\frac{R_{21} - R_{22}}{R_{21} + R_{22}}\right) \cdot \left(\frac{R_{31} - R_{32}}{R_{31} + R_{32}}\right) \le 1.$$

19. The infrared ray-tracing lens module 14, wherein the arrangement of the first positive diopter lens, the second positive diopter lens, and the negative diopter lens provides an auto temperature compensation function.

* * * * *